United States Patent [19]

Fenemore et al.

[11] Patent Number: 4,501,973
[45] Date of Patent: Feb. 26, 1985

[54] SKIDS FOR ROTATING MACHINERY

[75] Inventors: Keith E. Fenemore, Sleaford; George P. Foden, Newark; Christopher J. Baker, Lincoln, all of England

[73] Assignee: Ingersoll-Rand Company, Woodcliff Lake, N.J.

[21] Appl. No.: 377,728

[22] Filed: May 13, 1982

[30] Foreign Application Priority Data

May 14, 1981 [GB] United Kingdom ............... 8114831

[51] Int. Cl.³ .............................................. F16N 1/04
[52] U.S. Cl. .................................. 290/1 A; 60/39.31; 248/605; 248/638
[58] Field of Search ............... 290/1 A; 248/605–608, 248/638, 639, 663; 310/91; 60/39.31

[56] References Cited

U.S. PATENT DOCUMENTS

| 2,739,773 | 3/1956 | Rougemont | 310/91 |
| 4,101,102 | 7/1978 | Lloyd | 248/638 |
| 4,317,556 | 3/1982 | Dietrich | 248/605 |

Primary Examiner—J. V. Truhe
Assistant Examiner—Shelley Wade
Attorney, Agent, or Firm—B. J. Murphy

[57] ABSTRACT

A skid is disclosed which is particularly suitable for supporting rotating machinery in environments where it is exposed to temperature variations and external mechanical forces and where failure of the machinery can result in the generation of an extremely high torque which has to be absorbed. The skid basically comprises a machinery support platform which is connected to an elongate torsion resisting member in torque transmitting relationship and only three spaced supporting members each incorporating a universal joint and rigidly connected to the torsion resisting member. The torsion resisting member is preferably of hollow circular cross-section throughout its length and is disposed below the medial center line of the support platform and the three supporting members are disposed at the corners of an isosceles triangle and incorporate means allowing for limited movement of the torsion resisting member relative thereto.

15 Claims, 19 Drawing Figures

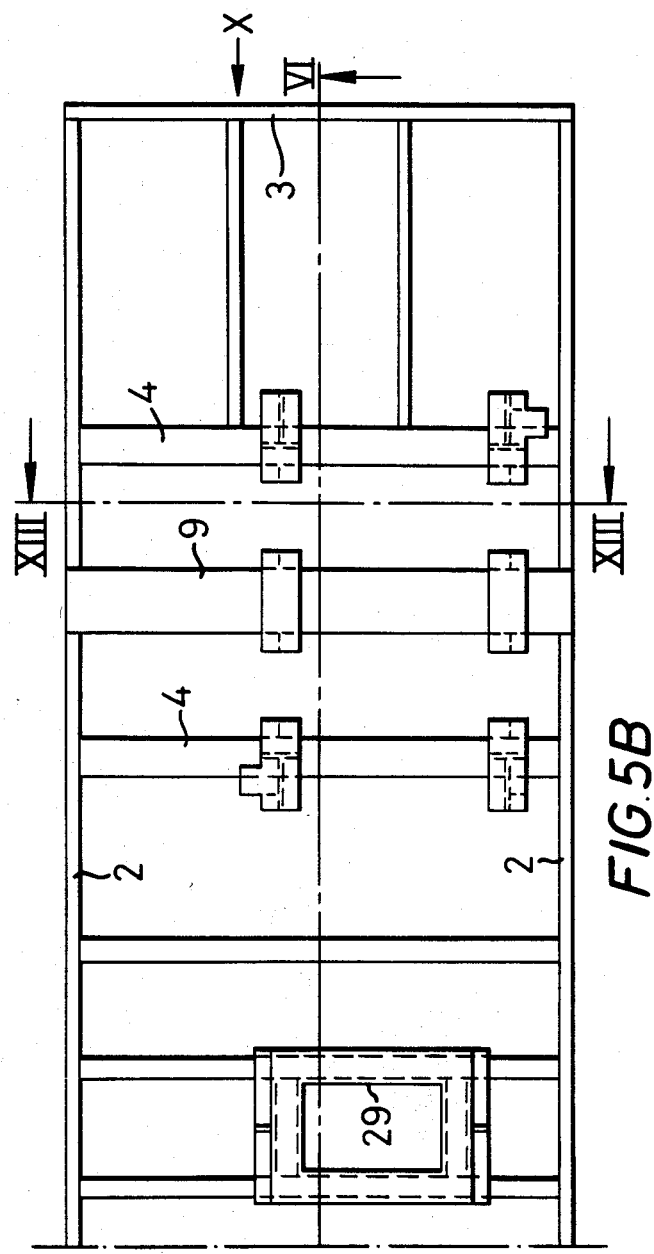

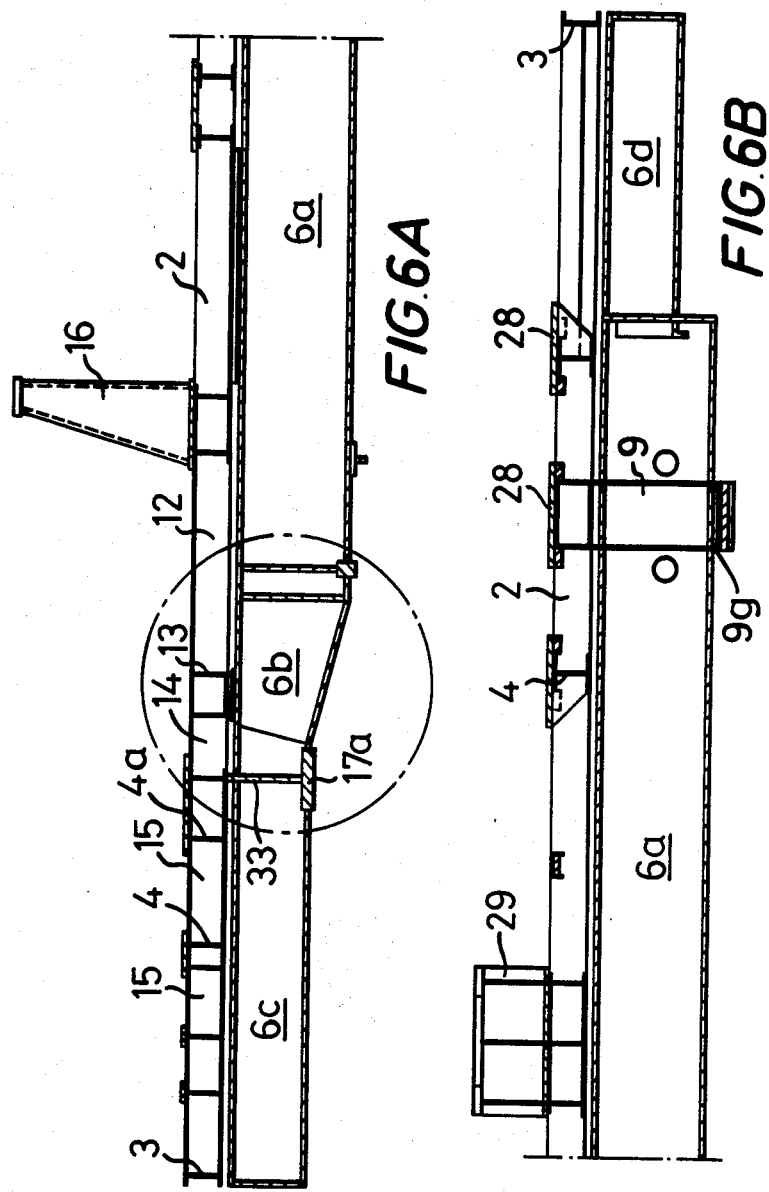

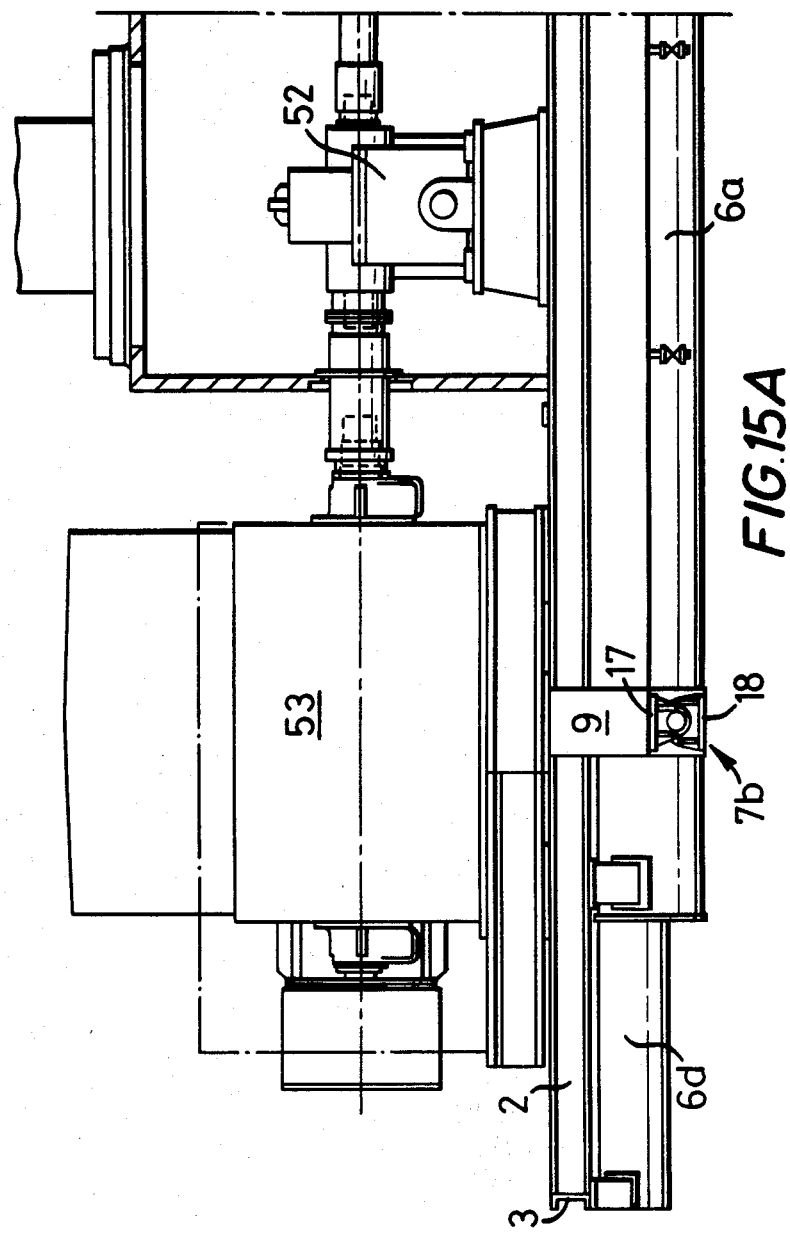

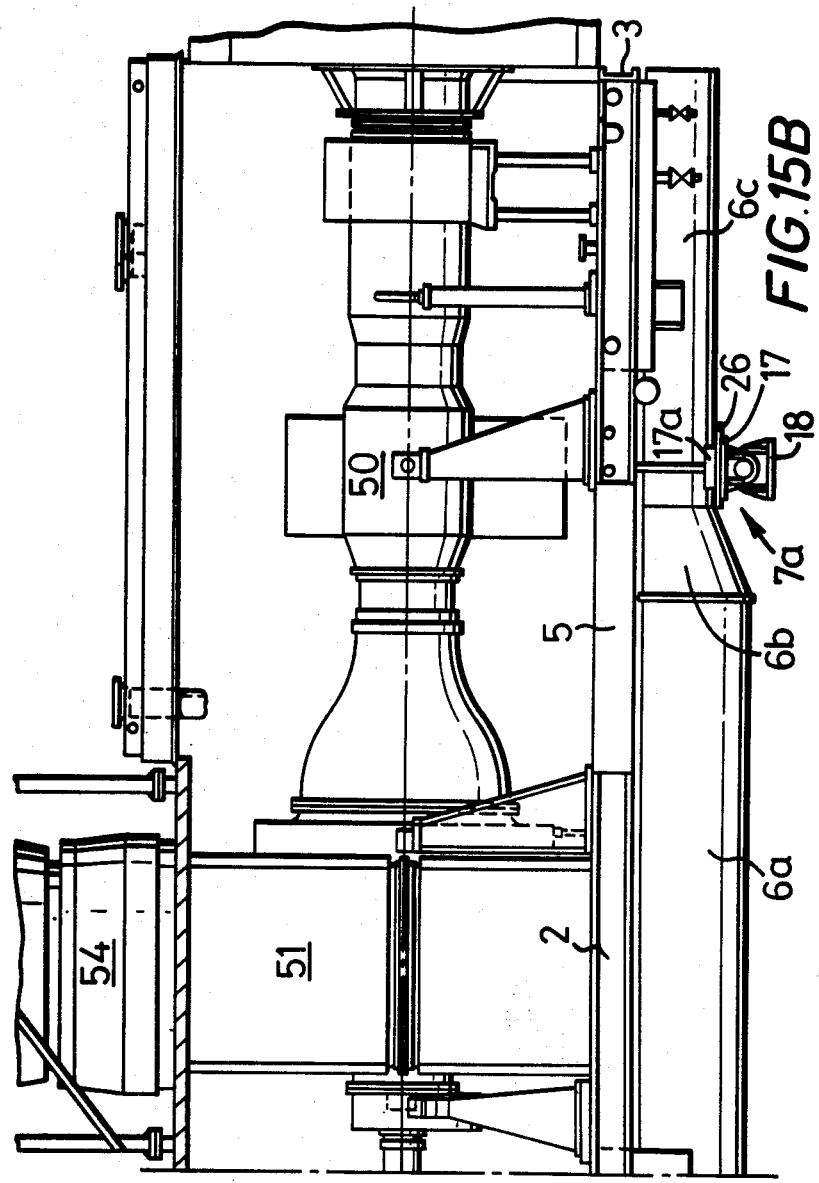

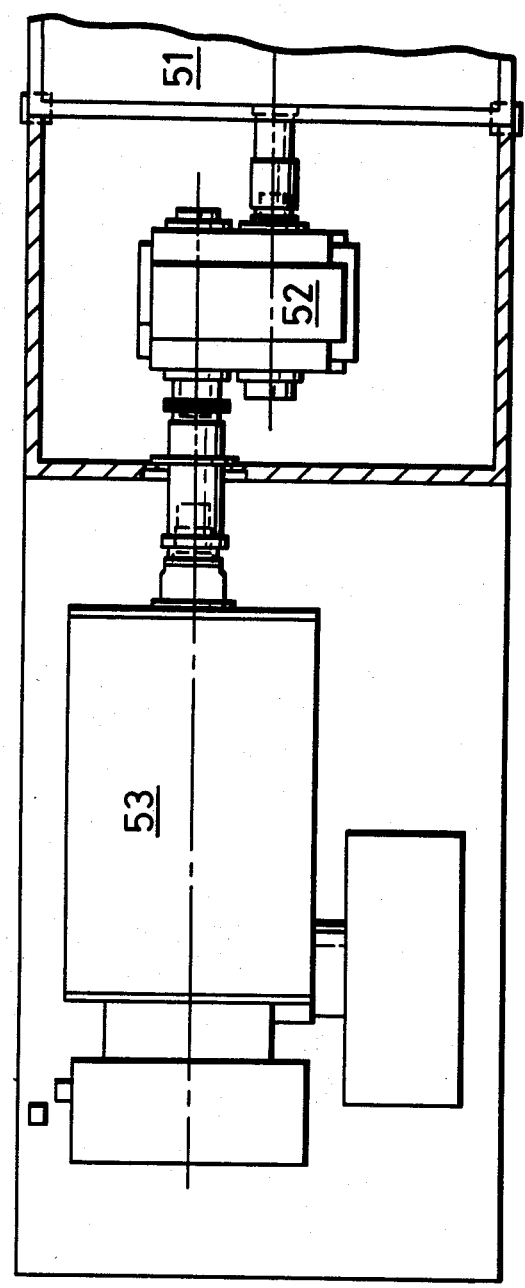

SKIDS FOR ROTATING MACHINERY

BACKGROUND OF THE INVENTION

This invention relates to improvements in skids for supporting rotating machinery.

There are applications where it is required to support heavy machinery on a base in such a manner that all loads are adequately supported and any substantial torque, including that generated by the instantaneous failure of a driven part, can be resisted and in such locations where the machinery may be exposed to severe external forces.

One such application with which the present invention is particularly, but not exclusively, concerned is where the machinery is an electrical generator for an oil rig. For example, such machinery can take the form of a gas generator such as an Avon gas generator driving a power turbine which in turn drives an electrical generator through a gear box and can weigh of the order of 85,000 lbs. Such an electrical generator can be designed to produce electrical power of the order of 9 MW and failure of the electrical generator due, for example, to a short-circuit, results in an extremely high torque which, although short-lived due to the consequent operation of circuit-breakers, nevertheless has to be absorbed. Such machinery on an oil rig could be exposed to winds of the order of 125 mph and the base on which it is mounted and which forms part of the rig structure can expand and contract due to thermal variations and be exposed to mechanical forces generated in the rig structure.

Conventionally, such machinery is mounted on a base frame or skid which is secured to a deck of the rig by bolts after being levelled by shim-plates or packings and which is composed of beams, e.g., of I-section and H-section dimensioned to withstand the high stresses and forces involved. Such a base frame, being designed for maximum strength is unduly heavy and yet nevertheless in use, and even under its own weight in transportation to site can deform to an extent to produce misalignment between the design axes for the drive shafts between the turbine and the gear box and the generator with consequent significant problems in installing the machinery or in replacing a part of the machinery in use on the rig.

SUMMARY OF THE INVENTION

It is an object of the present invention to provide an improved base frame or skid for rotating machinery in which the disadvantages referred to above are materially reduced and which will be considerably lighter in weight than conventional base frames or skids used for a comparable task.

The present invention, broadly stated, provides a skid for mounting and supporting rotating machinery comprising an elongate torsion resisting member rigidly connected to only three spaced supporting members each incorporating a universal joint and a machinery support platform connected to the torsion resisting member in torque transmitting relationship thereto.

Preferably, the torsion resisting member is hollow and of circular cross-section throughout its length.

The three spaced supporting members are advantageously disposed at the corners of an isosceles triangle with one directly connected to the torsion resisting member and the other two connected thereto by a cross-member connected to the platform in load and torque transmitting relationship with the said other two spaced supporting members disposed one on each side of the torsion resisting member.

The three spaced supporting members with advantage incorporate means allowing for limited movement of the torsion resisting member relative thereto to accommodate thermal expansion and contraction.

The machinery support platform preferably comprises a generally rectangular frame with cross-members connected to the torsion resisting member in torque transmitting relationship.

With advantage, the longitudinal sides of the frame include box-section members to provide increased strength.

It is preferred that the three spaced supporting members be constructed to allow a limited displacement in a direction normal to the general direction of length of the torsion resisting member with the one supporting member directly connected to the torsion resisting member being connected thereto by means allowing a displacement of the torsion resisting member relative thereto in its general direction of length.

One embodiment of the invention will now be described by way of example, reference being made to the accompanying drawings.

BRIEF DESCRIPTION OF THE DRAWINGS

FIG. 16 is a fragmentary plan view showing machinery on the skid.

DESCRIPTION OF THE PREFERRED EMBODIMENT

Figure 1:
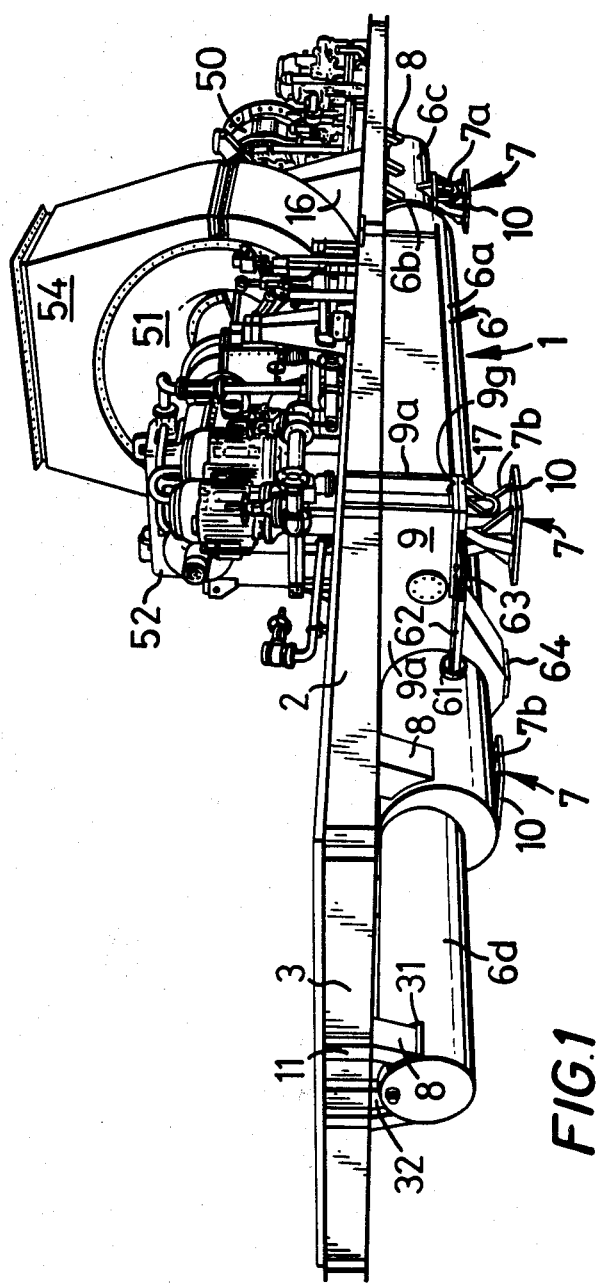
FIG. 1 is a side perspective view of a skid according to the invention for supporting rotating machinery, some of the machinery being shown supported thereon.
Figure 2:
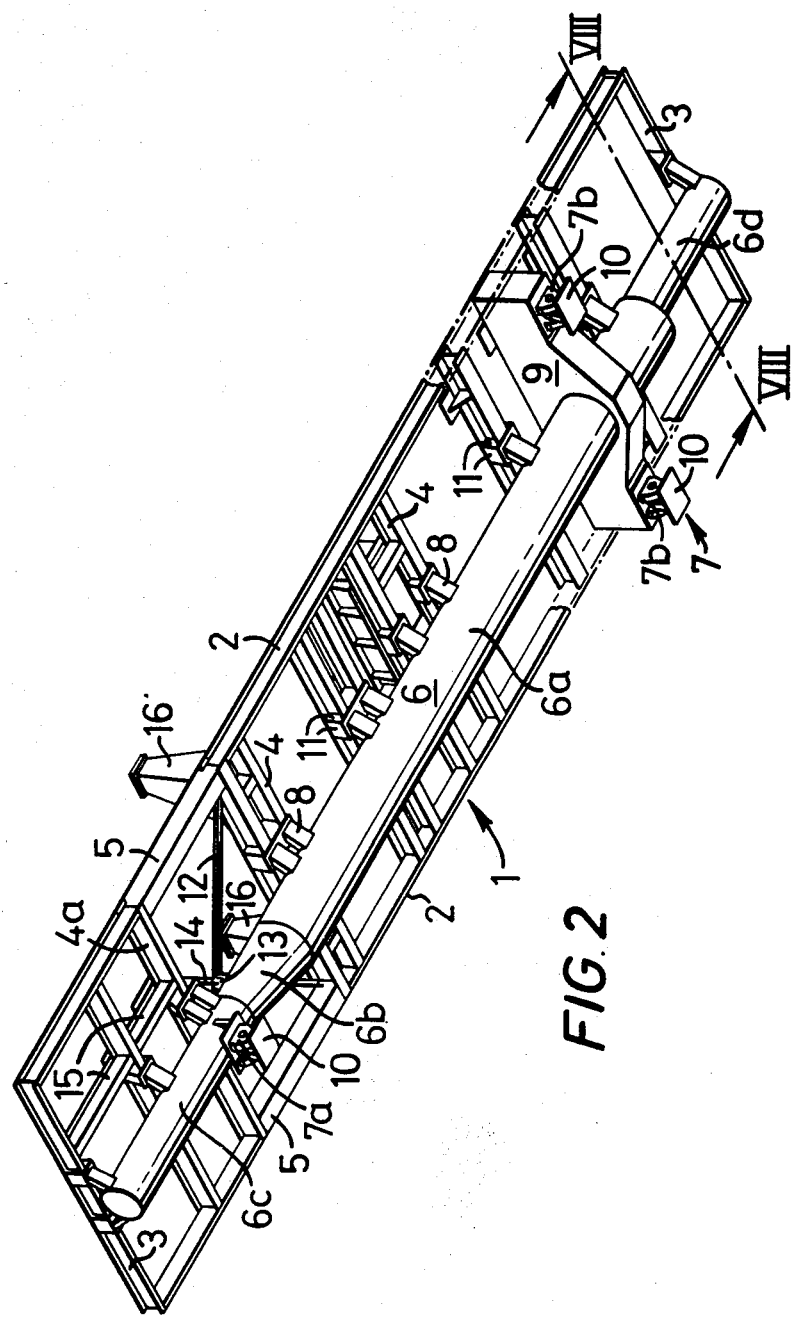
FIG. 2 is an underneath perspective view of the skid shown in FIG. 1.

Referring to FIGS. 1 and 2 there is shown a skid indicated generally at 1 for rotating machinery constructed in accordance with the present invention. It comprises a generally rectangular frame having longitudinal side members 2, end members 3 and cross members 4 intermediate the ends. The members are of suitable section, e.g., I-section, U-section, or box section and box section members are shown at 5 where the greatest strength is required.

The frame is connected in load and torsion transmitting relationship to a torsion resisting member 6 which is disposed below the frame and which is intended to be supported on only three supporting members 7 secured thereto. The torsion resisting member 6 could be solid but this would increase its weight and make it unsuitable for some applications. It could be hollow and of any desired cross-section but, for optimum effect, it is of circular cross-section throughout its length and will hereafter be referred to as the torsion tube 6. The torsion tube 6 is not essentially disposed along and below the medial centre line of the frame but this is the preferred construction as illustrated.

The torsion tube 6 is secured to the frame by members 8 as will be described hereafter.

The three supporting members 7 are in the form of universal joints which in this example are arranged at the corners of an isosceles triangle, one (identified as 7a) being directly connected to the torsion tube 6 and the other two (identified as 7b) being disposed on either side of the torsion tube and being carried on a cross-piece 9 securely connected to the torsion tube 6. The universal joints 7 include base plates 10 intended to be bolted or otherwise secured to a base, in this case, the deck of an oil rig. As a plane can pass through any three given points it will be understood that the provision of these three universal joints 7 as the sole means for supporting the skid on a deck greatly facilitates the installation of a skid according to the invention and materially reduces the effect of any forces from the rig tending to distort the frame and produce misalignment of the axes of driven and driving members of the rotating machinery to be carried on the skid.

As the universal joint 7a is carried directly on and below the torsion tube 6, the latter is of reduced cross-section at this location. The torsion tube 6 as can be seen in FIG. 1 has a central portion 6a of greatest cross-section which tapers at one end, as at 6b, to a reduced cross-section to the portion 6c which supports the universal joint 7a and, which towards its other end, is secured to the cross-piece 9 and then, in this example, changes to a terminal smaller diameter portion 6d although in practice this portion 6d could be of the same diameter as the portion 6a and a continuation thereof.

As can be seen in FIG. 2 the members 8 (which are of boxsection) are secured to the cross-members 4 which are I-beams and which are closed by plates 11 to give a box-like structure of greater strength. Also, the box section members 5 are connected to the torsion tube 6 by thrust members 12 which are secured to a hollow cylindrical part 13 integrally welded to and upstanding from the torsion tube 6. Further thrust members 14 extend from the cylindrical part 13 effectively as continuations of the thrust members 12 to give an X-like configuration and are secured to one of the frame cross members 4 (identified as 4a) which is strengthened by beams 15 extending from that cross-member 4a to the adjacent end 3 of the frame and extending parallel to the longitudinal sides 2.

The frame is shown carrying pillars 16 for mounting the machinery on the frame.

Figure 3:
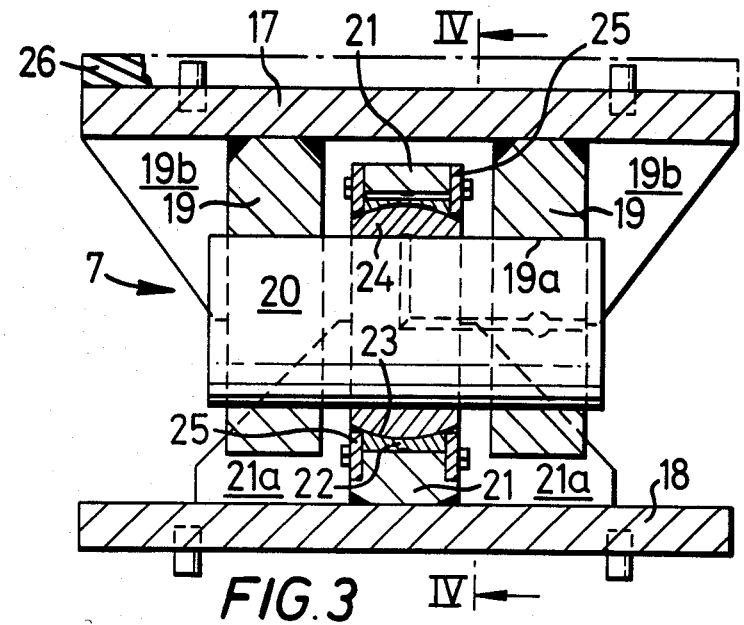
FIG. 3 is a section taken on the line III—III of FIG. 4 of a supporting member incorporating a universal joint, part being shown in elevation.
Figure 4:
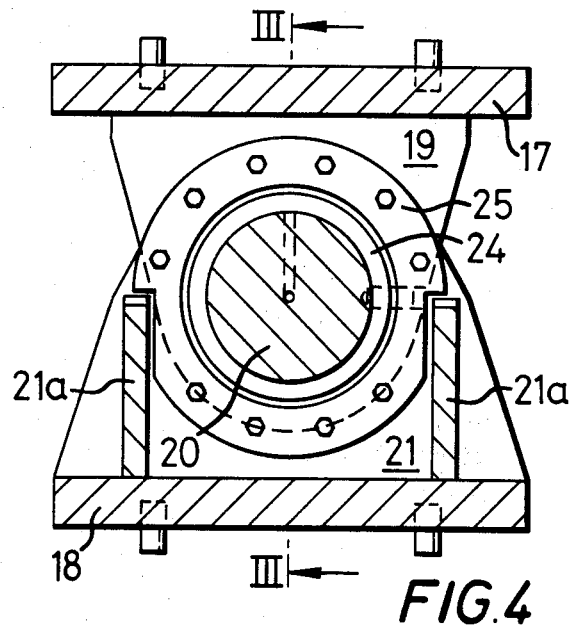
FIG. 4 is a section taken on the line IV—IV of FIG. 3, FIGS. 5A and 5B conjoined represent a plan view of a skid similar to that shown in FIG. 2, but shown in greater detail, the torsion transmitting member not being shown, FIGS. 6A and 6B conjoined represent a section taken on the line VI—VI of FIGS. 5A and 5B conjoined.

FIGS. 3 and 4 illustrate a suitable universal joint 7. Such a joint 7 comprises a top mounting plate 17 for securing the joint to the frame through the torsion tube 6 and a bottom mounting plate 18 (corresponding to the base plate 10 previously described) for securing the universal joint to the deck of the oil rig. Two spaced flanges 19 depend from the top mounting plate 17 and are formed with aligned apertures 19a through which a bearing shaft 20 extends. Support flanges 19b are secured between the flanges 19 and the top mounting plate 17. The bottom mounting plate 18 carries an upstanding wall 21 extending between the depending flanges 19 and having a through bore axially aligned with the apertures 19a in which through bore is received an outer bearing 22 having a part-spherical bearing surface 23 engaged with a part-spherical inner bearing 24 through which the bearing shaft 20 extends as a relatively close fit. The outer bearing 22 is retained by end plates 25 and the upstanding wall 21 is supported by strengthening flanges 21a secured to the bottom mounting plate 18. The top mounting plate 17 can therefore rotate about the axis of the bearing shaft 20 relative to the bottom mounting plate 18 and about an axis normal to the axis of the bearing shaft 20 by virtue of the part-spherical inner bearing 24.

It is to be noted that the upstanding wall 21 extends between but is spaced from the depending flanges 19. This allows for a limited relative displacement between the top and bottom mounting plates 17 and 18 in a direction parallel to the axis of the bearing shaft 20. The provision of such limited displacement enables dimensional changes resulting from thermal effects to be accommodated. It will be seen in FIGS. 1 and 2 that the spaced universal joints 7a and 7b are mounted with the axes of the shafts 20 normal to the direction of length of the torsion tube 6 so that expansion of the skid in the direction of the axes of the shafts 20, e.g., due to thermal effects, is accommodated. The axis of the shaft 20 of the universal joint 7a could be parallel to the direction of length of the torsion tube 6 to accommodate changes in the length of the torsion tube 6 due to thermal effects but it is preferred that the axis of the shaft 20 of the joint 7a should also be normal to the direction of length of the torsion tube 6, as described, so that all the joints 7 are mounted in the same attitude and can accommodate a limited relative movement between the top and bottom mounting plates 17 and 18 in the direction normal to the direction of length of the torsion tube 6. Changes in length of the torsion tube 6 due to thermal effects are accommodated by providing the joint 7a with a layer 26 (FIG. 3) of friction material disposed over the top plate 17 and intended to be sandwiched between this top plate 17 and a support plate 17a (FIGS. 6A, 10 and 11) secured to the torsion tube 6 to allow relative movement between the mounting plate 17 and the support plate 17a, such movement being limited both to the direction normal to the axis of the shaft 20 and in extent by bolts 27 secured to the mounting plate 17 and extending through guide slots 17b in the supporting plate 17a (FIG. 11).

Figure 5A:
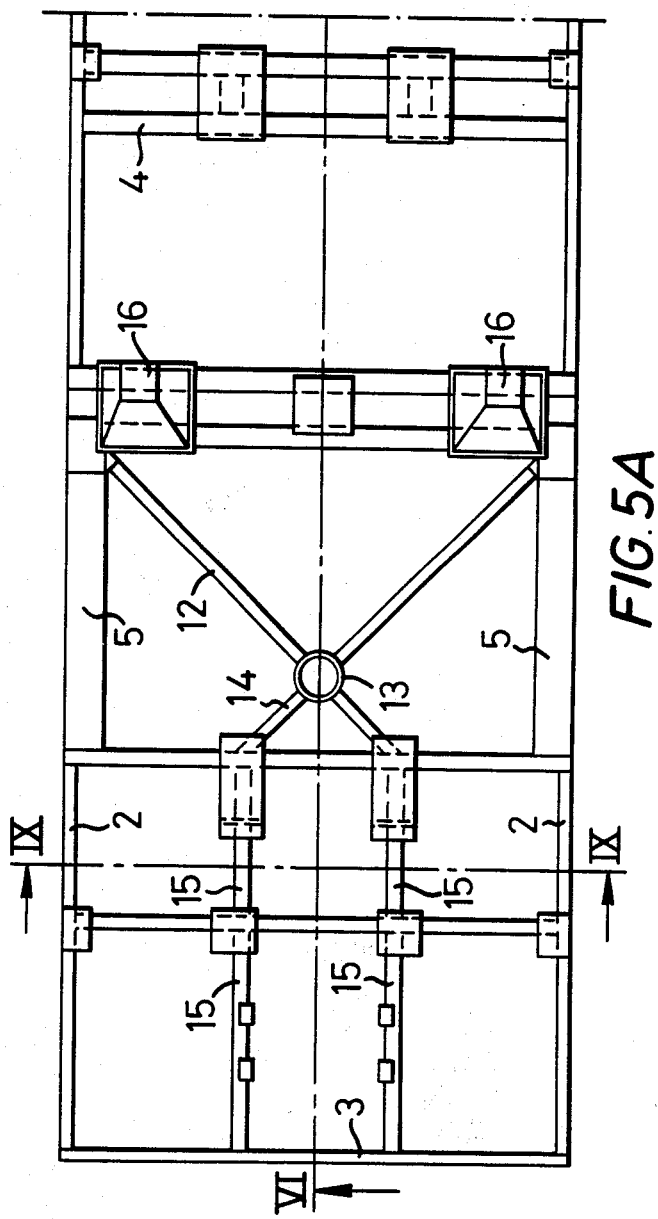
Figure 7:
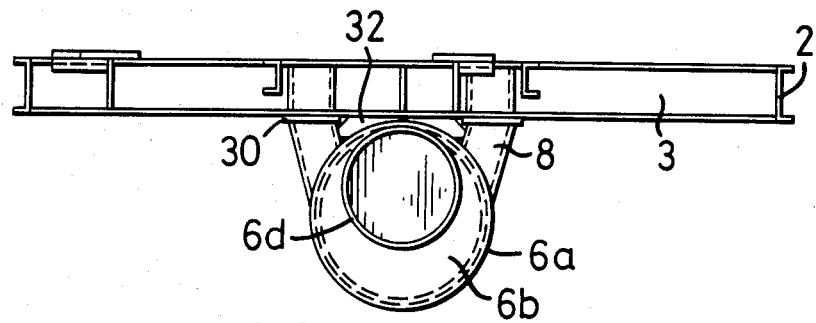
FIG. 7 is an end elevational view of the skid shown in FIGS. 5A and 5B as seen in the direction of the arrow X.

FIGS. 5A and 5B together show a plan view of a skid according to the invention, the torsion tube 6 being omitted in this view but being shown in the view of this skid shown in FIGS. 6A and 6B and the end elevational view shown in FIG. 7 in which the pillars 16 are omitted. The skid shown in FIGS. 5A and 5B is the same as that illustrated in FIGS. 1 and 2 and like reference numerals are used to indicate like parts. These figures, however, illustrate the construction in greater detail and include the means of support for various items of the rotating machinery such as support plates 28 for an A.C. generator and a base 29 for a gear as will become apparent hereafter.

Figure 8:
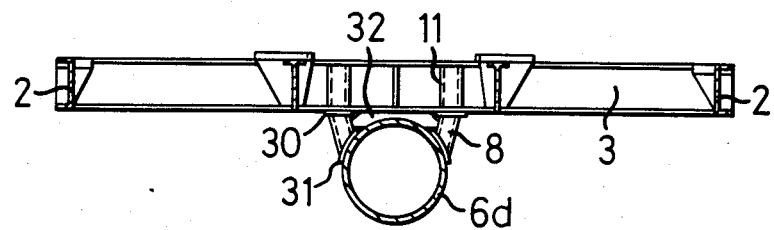
FIG. 8 is a section taken on the line VIII—VIII of FIG. 2.

As can be seen in greater detail in FIG. 8, the torsion tube is generally secured to the frame by one or more pairs of members 8 each member being of rectangular hollow section and having one end plate 30 secured as by welding to an end member 3, which is converted to box-section at that location by plates 11 for increased strength, and another end plate 31 of curved configuration welded to the torsion tube.

Further strengthening is achieved by a plate 32 of substantially trapezoidal configuration which extends between and is welded to the members 8 of a pair of such members and at its top side is welded to the end member 3 of the frame and at its bottom side is welded to the torsion tube 6.

Figure 9:
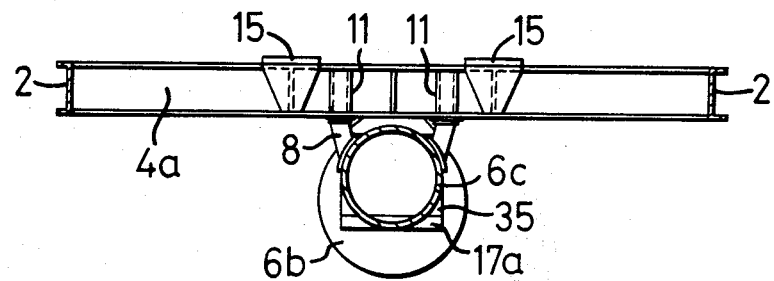
FIG. 9 is a section taken on the line IX—IX of FIG. 5A.
Figure 10:
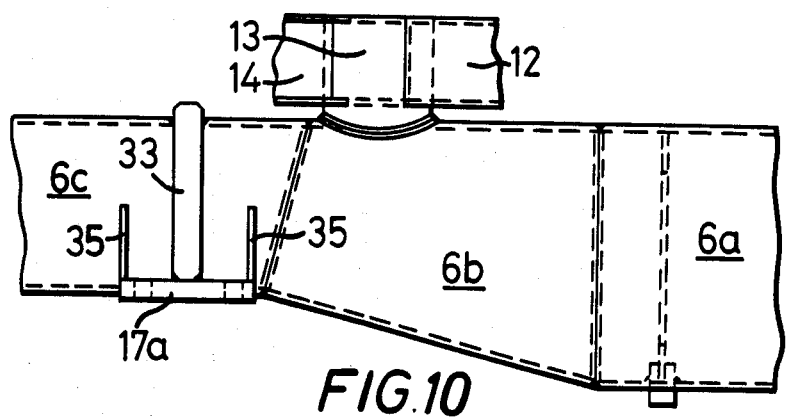
FIG. 10 is an enlarged side elevation of a detail shown within the circle of FIG. 6A.
Figure 11:
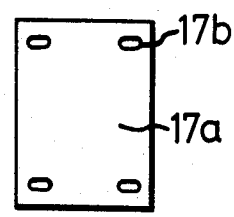
FIG. 11 is an underplan view of part of FIG. 10.

As can be seen in FIGS. 6A, 9 and 10, a similar connection is effected at the location of the universal joint 7a. However in order to be supported on the universal joint 7a the torsion tube portion 6c extends through and beyond a substantially rectangular plate 33 to which it is welded and which carries the mounting plate 17a previously referred to. The mounting plate 17a also carries two spaced reinforcing plates 35 welded to both the mounting plate 17a and the torsion tube portion 6c. This can best be seen in FIGS. 6A, 9, 10 and 11 although, in FIG. 9, the upper part of the rectangular plate 33 is concealed behind the members 8 and the strengthening plate 32. It will be seen that the wall of the torsion tube portion 6c is cut away to allow the mounting plate 17a to extend thereinto and through it for a very short distance, the mounting plate 17a being welded to the wall of the torsion tube portion 6c.

Figure 12:
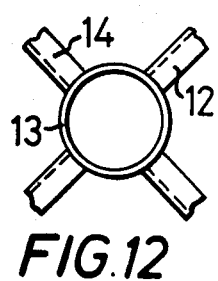
FIG. 12 is a fragmentary top plan view of another part of FIG. 10.

FIGS. 10 and 12 illustrate in greater detail the reinforcing structure provided by the hollow cylindrical part 13 which is welded to the tapered torsion tube portion 6b and connected by radially extending thrust members 12 and 14 to the frame to take up axial thrust of the Avon gas generator.

Figure 13:
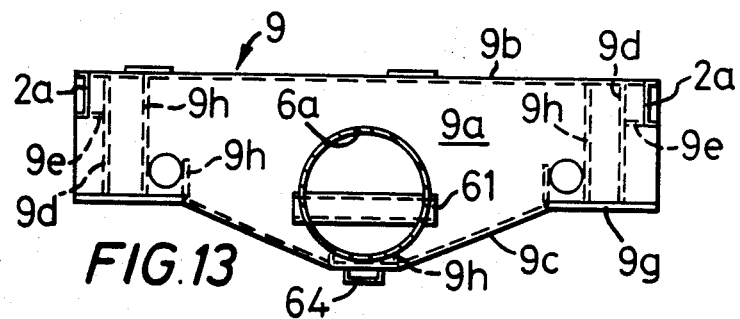
FIG. 13 is a section taken on the line XIII—XIII of FIG. 5B.

As previously described, the universal joints 7b are mounted on a cross-piece 9 and this is shown in greater detail in FIG. 13. In this example, the cross-piece 9 is of hollow construction to limit the weight factor and basically comprises two spaced plates 9a through which the torsion tube portion 6a extends and to which it is welded on both the inner and outer faces of the plates 9a and top and bottom plates 9b and 9c are welded to the plates 9a. Inwardly of each end of the cross piece 9 reinforcing plates 9d are welded betweeen the spaced plates 9a to increase rigidity and a further plate 9e extends outwardly from the plates 9d to define a gap dimensioned to receive U-shaped beams 2a forming part of the longitudinal side members 2 of the frame. These beams 2a are welded between the top plate 9b and the plates 9e to provide continuity of the side members 2. The spaced plates 9a are formed with a slot 9f which intersects the aperture through which the torsion tube portion 6a extends to accommodate thermal expansion effects. Mounting plates 9g towards the extremities of the cross-piece 9 and on the underside thereof provide a means for mounting the universal joints thereon by securing the top plate 17 of such joints thereto. Additional reinforcing plates 9h may be welded between the spaced plates 9a to increase the strength of the cross piece as required. On each side of the cross-piece 9 the torsion tube portion 6a is formed with a pair of opposed apertures and a tube 61 (FIGS. 1 and 13) extends through the torsion tube portion 6a at each such location and is welded to the walls of the opposed pair of apertures. A tie bar 62 extends through each tube 61 and is welded or otherwise secured at its ends to extensions 63 of the top plates 17 of the universal joints 7b to provide enhanced resistance against twisting. Although this arrangement of the tie bars is described and illustrated, such tie bars are in fact not necessary. The bottom of the cross piece 9 has a short length of a box or U-section member 64 welded thereto to provide a key on the medial plane of the torsion tube 6 which key is intended to be located in a corresponding key-way on the deck of the oil rig. This locates and fixes the axis of the skid and ensures that any expansion or contraction is taken up by the universal joints 7b.

Figure 14:
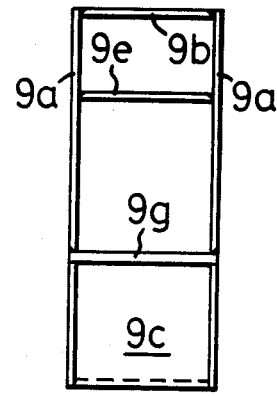
FIG. 14 is an enlarged end elevation of the cross piece shown in FIG. 13, FIGS. 15A and 15B conjoined represent a side elevation of the skid shown in FIGS. 5A and 5B carrying rotating machinery.

FIG. 14 shows an end elevation of the cross piece 9 to a larger scale before attachment to the beams 2a.

FIGS. 15A and 15B conjoined show a side elevation of the skid 1 carrying rotating machinery which in this example comprises an Avon gas generator 50 which generates the thrust to drive a power turbine 51 which, through a gear 52, drives an A.C. generator 53 capable of generating 9 MW of energy. Exhaust gases from the turbine 51 are vented through the stack 54.

The centre of gravity of the gas generator 50 is approximately above the universal joint 7a and the thrust members 12 and 14 together with the cylindrical part 13 materially assist in absorbing thrust and transmitting torsion to the torsion tube 6 during normal operation and particularly if the generator 53 should short circuit. It will be appreciated that if the generator 53 should short circuit, it would in effect seize up for a very short time until associated circuit breakers were operated. This would generate an immense torque as the gas generator 50 and power turbine 51 would still be attempting to drive the generator 53 and this torque is transmitted through the frame to the torque tube 6 which is capable of absorbing such torque and which is supported on only three universal joints 7. This feature ensures that the axes of the drives from the gas turbine 51 to the gear 52 and to the A.C. generator 53 remain substantially in alignment and enables the apparatus to be set up on site after transportation with minimal realignment following alignment in the factory.

The axes of the gas generator 50, power turbine 51 and the drive to the gear 52 are in the same medial plane as that which contains the medial plane of the torque tube 6, but it can be seen from FIG. 16 that the axis of the drive to the A.C. generator 53 is offset therefrom. It is not essential that the medial vertical plane of the rotating machinery should coincide with the medial vertical plane of the torque tube.

The rotating machinery or parts thereof may be housed in a light-weight sound absorbing material and it will be appreciated that the structure described is significantly lighter in weight than known structures whilst at the same time having the advantages referred to.

If the structure described is to be mounted in an exposed location, the whole may be disposed in a housing resistant to the winds and the weather. Such a housing could be mounted on and secured to the deck of the rig or to the frame.

It will be appreciated that although the skid has been described as supporting a gas generator driving an A.C. generator through a power turbine and a gear, the prime mover could be a reciprocating engine and the gear could be used to drive a compressor. The skid described is of use in any application requiring machinery to be supported where a torque is or may be required to be absorbed.

I claim:

1. A skid for mounting and supporting rotating machinery comprising only three spaced supporting members each incorporating a universal joint, an elongate torsion resisting member rigidly connected to said supporting members and a machinery support platform connected to said torsion resisting member in torque transmitting relationship thereto; wherein said torsion resisting member has first and second portions which have separate, parallel axes; and one of said first and second portions is connected to but one of said supporting members, and the other of said portions is connected to the other two of said three supporting members.

2. A skid according to claim 1 in which said torsion resisting member is hollow and of circular cross-section throughout its length.

3. A skid according to claim 1 in which said three spaced supporting members incorporate means allowing for limited movement of said torsion resisting member relative thereto to accommodate thermal expansion and contraction.

4. A skid according to claim 1 in which a cross-member is connected to said support platform in load and torque transmitting relationship and to said torsion resisting member, said one of said supporting members is directly connected to said torsion resisting member and the other two of said three supporting members are connected to said cross-member one on each side of said torsion resisting member, the three spaced supporting members being disposed at the corners of an isosceles triangle.

5. A skid according to claim 4 in which said three spaced supporting members incorporate means allowing for limited movement of said torsion resisting member relative to said supporting members in the direction normal to the direction of length of said torsion resisting member.

6. A skid according to claim 4 in which said one of said supporting members incorporates means allowing for limited movement of said torsion resisting member relative to said one of said supporting members in the direction of length of said torsion resisting member.

7. A skid for mounting and supporting rotating machinery comprising a substantially rectangular frame incorporating strengthening cross-members, a load bearing cross-member connected to said frame and extending transversely thereof, a hollow elongate torsion resistant member of circular cross-section throughout its length extending lengthwise of said frame and secured to said frame and to said load bearing cross-member, a first supporting member incorporating a universal joint secured directly to a first portion of said torsion resisting member through means allowing limited displacement of said torsion member relative to said first supporting member in the direction of length of said torsion resisting member, and second and third supporting members connected to said load bearing cross-member on either side of a second portion of said torsion resisting member and incorporating means allowing limited displacement of said torsion resisting member relative thereto in the direction normal to the direction of length of said torsion resisting member; and wherein said first and second portions have separate, parallel axes.

8. A skid according to claim 7 including a driving member supported on said frame over said first supporting member and a driven member supported on said frame over said load bearing cross-member.

9. A skid according to claim 7 in which said first, second and third supporting members are respectively disposed at the corners of an isosceles triangle.

10. A skid for mounting and supporting rotating machinery comprising a substantially rectangular frame composed of side beams, end beams and cross beams extending between said side beams intermediate the length thereof, said side beams incorporating box section members, a load bearing cross-member connected to said side members and extending transversely across said frame and depending therefrom, a hollow elongate torsion resistant member of circular cross-section throughout its length, and having first and second portions which have separate, parallel axes, extending lengthwise of and below said frame parallel to said side beams and substantially midway therebetween, said torsion resisting member being secured to said end beams and at least some of said cross beams and extending through said cross-member and being secured thereto, three supporting members each including an upper mounting plate and a lower mounting plate connected therebetween by a universal joint allowing relative angular displacement between said plates and linear displacement of the upper mounting plate in one direction only relative to the lower mounting plate, only one of said supporting means having the upper mounting plate directly connected to one of said first and second portions of said torsion resisting member through means allowing limited displacement of said torsion resisting member relative to said upper mounting plate in a second direction parallel to the direction of length of said torsion resisting member and normal to said one direction, and the upper mounting plates of the other two of said three supporting members being connected towards opposed ends of said load bearing member with said one direction extending normal to the direction of length of said torsion resisting member.

11. A skid according to claim 10 in which a locating keying means is secured to said load bearing cross member for orienting the lengthwise direction of said torsion resisting member.

12. A skid according to claim 10 in which said torsion resisting member has a portion of reduced diameter and the mounting plate of said one supporting member is directly connected to said reduced diameter portion.

13. A skid according to claim 12 in which said reduced diameter portion of said torsion resisting member is connected to cross beams and the latter are connected to said box section members.

14. A skid according to claim 12 in which a hollow cylindrical part is integrally secured to said reduced diameter portion and thrust members are secured between said hollow cylindrical part and said frame in an X-configuration.

15. A skid according to claim 10 in which a gas generator is supported on said frame over said one supporting member and an A.C. generator is drivenly connected to said gas generator and supported on said frame over said load bearing cross-member.

* * * * *